(12) United States Patent
Riley et al.

(10) Patent No.: US 10,649,680 B2
(45) Date of Patent: May 12, 2020

(54) DUAL-PORT NON-VOLATILE DUAL IN-LINE MEMORY MODULES

(71) Applicant: HEWLETT PACKARD ENTERPRISE DEVELOPMENT LP, Houston, TX (US)

(72) Inventors: Dwight D. Riley, Houston, TX (US); Joseph E. Foster, Houston, TX (US); Thierry Fevrier, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 182 days.

(21) Appl. No.: 15/540,237

(22) PCT Filed: Apr. 30, 2015

(86) PCT No.: PCT/US2015/028625
§ 371 (c)(1),
(2) Date: Jun. 27, 2017

(87) PCT Pub. No.: WO2016/175857
PCT Pub. Date: Nov. 3, 2016

(65) Prior Publication Data
US 2018/0004422 A1    Jan. 4, 2018

(51) Int. Cl.
*G06F 3/06*        (2006.01)
*G06F 12/1081*     (2016.01)
(Continued)

(52) U.S. Cl.
CPC ............ *G06F 3/065* (2013.01); *G06F 3/0619* (2013.01); *G06F 3/0679* (2013.01);
(Continued)

(58) Field of Classification Search
CPC ...... G06F 3/065; G06F 3/0619; G06F 3/0679; G06F 12/1081; G06F 13/1684;
(Continued)

(56) References Cited

U.S. PATENT DOCUMENTS 4,633,440 A    12/1986  Pakulski
6,816,889 B1 *  11/2004  Graham ................ H04L 29/06
                                                    709/213
(Continued)

FOREIGN PATENT DOCUMENTS

WO    WO-2014003764    1/2014

OTHER PUBLICATIONS

Haibo, Z. et al., A Distributed Control System Communication Mode Based on UDP Datagram and Dual-port Memory, (Research Paper), May 15-17, 2009, 4 Pages.

*Primary Examiner* — William E. Baughman
(74) *Attorney, Agent, or Firm* — Nolte Intellectual Property Law Group

(57) ABSTRACT

According to an example, a dual-port non-volatile dual in-line memory module (NVDIMM) includes a first port to provide a central processing unit (CPU) with access to universal memory of the dual-port NVDIMM and a second port to provide an external NVDIMM manager circuit with access to the universal memory of the dual-port NVDIMM. Accordingly, a media controller of the dual-port NVDIMM may store data received from the CPU through the first port in the universal memory, control dual-port settings received from the CPU, and transmit the stored data to the NVDIMM manager circuit through the second port of the dual-port NVDIMM.

20 Claims, 9 Drawing Sheets

(51) Int. Cl.
  *G06F 13/16* (2006.01)
  *G06F 11/20* (2006.01)
  *G06F 13/28* (2006.01)
(52) U.S. Cl.
  CPC ...... *G06F 12/1081* (2013.01); *G06F 13/1684* (2013.01); *G06F 11/2023* (2013.01); *G06F 13/28* (2013.01); *G06F 2201/805* (2013.01); *G06F 2201/82* (2013.01); *G06F 2212/656* (2013.01)
(58) Field of Classification Search
  CPC ................ G06F 13/28; G06F 11/2023; G06F 2201/805; G06F 2201/82; G06F 2212/656
  USPC ........................................................ 711/103
  See application file for complete search history.

(56) References Cited

U.S. PATENT DOCUMENTS

| | | |
|---|---|---|
| 7,024,518 B2 | 4/2006 | Halbert et al. |
| 8,949,502 B2 | 2/2015 | McKnight et al. |
| 2002/0112119 A1 | 8/2002 | Halbert et al. |
| 2006/0095620 A1* | 5/2006 | Dreps ................ G06F 13/1684 710/100 |
| 2011/0035575 A1* | 2/2011 | Kwon .................. G06F 9/4405 713/2 |
| 2012/0005400 A1* | 1/2012 | Winderweedle .... G06F 13/1657 711/5 |
| 2012/0131253 A1 | 5/2012 | McKnight et al. |
| 2013/0086309 A1 | 4/2013 | Lee et al. |
| 2014/0201314 A1* | 7/2014 | Borkenhagen ...... G06F 11/1666 709/216 |
| 2014/0215277 A1 | 7/2014 | Judd |
| 2014/0237205 A1 | 8/2014 | Takefman et al. |
| 2015/0212760 A1* | 7/2015 | Goel ..................... G06F 3/0689 714/6.3 |
| 2015/0254003 A1* | 9/2015 | Lee ...................... G06F 13/382 711/103 |
| 2015/0261446 A1* | 9/2015 | Lee ...................... G06F 13/385 711/103 |
| 2015/0262633 A1* | 9/2015 | Lee ...................... G11C 7/1075 710/308 |
| 2015/0378767 A1* | 12/2015 | Tarasuk-Levin ...... G06F 16/273 718/1 |

\* cited by examiner

DUAL-PORT NON-VOLATILE DUAL IN-LINE MEMORY MODULES

BACKGROUND

A non-volatile dual in-line memory module (NVDIMM) is a computer memory module that can be integrated into the main memory of a computing platform. The NVDIMM, or the NVDIMM and host server, provide data retention when electrical power is removed due to an unexpected power loss, system crash, or a normal system shutdown. The NVDIMM, for example, may include universal or persistent memory to maintain data in the event of the power loss or fatal events.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
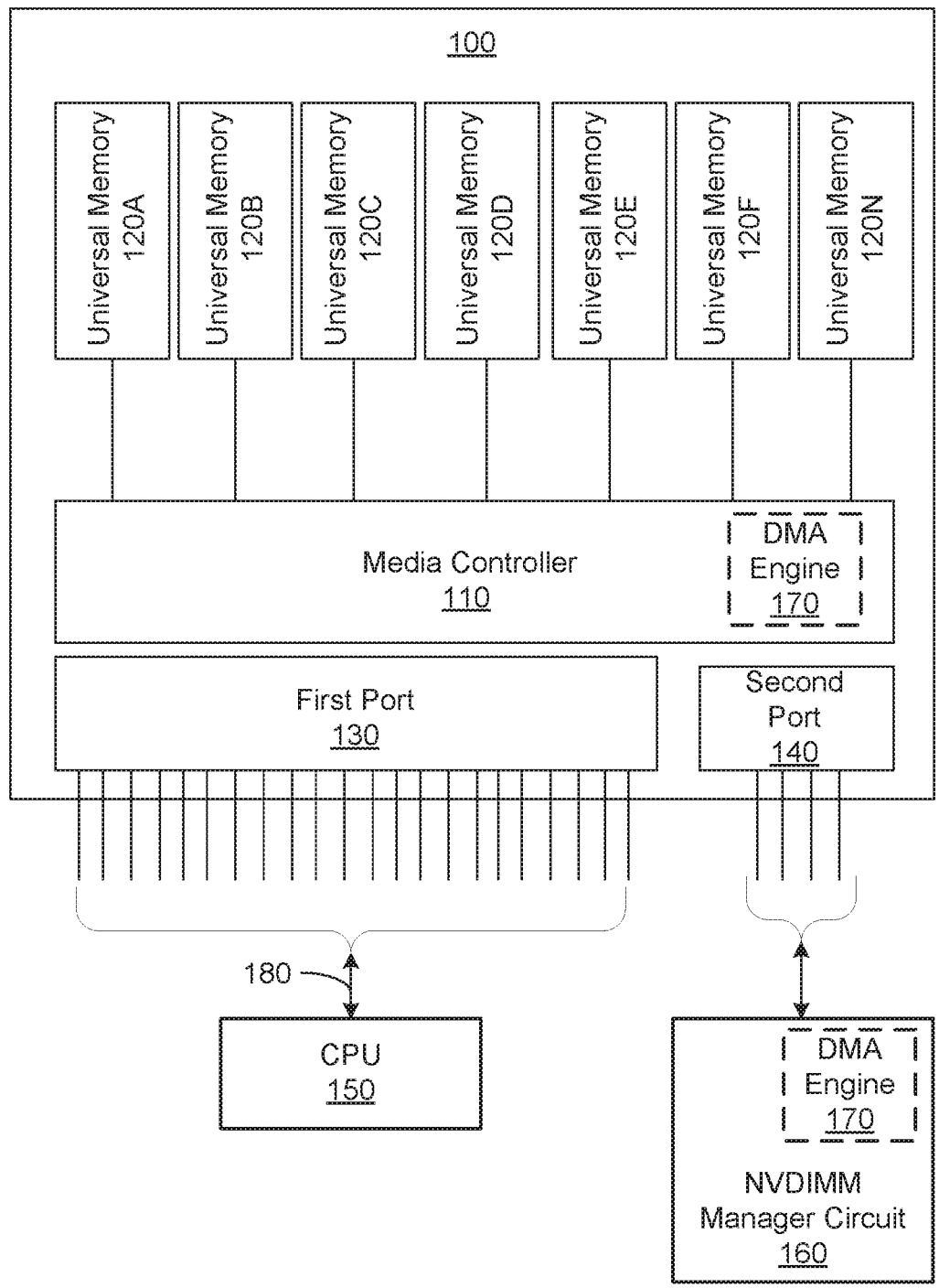
FIG. 1 shows a block diagram of a dual-port non-volatile dual in-line memory module (NVDIMM), according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are examples of dual-port non-volatile dual in-line memory modules (NVDIMMs) for memory application servers. The dual-port architecture of the disclosed examples allows a NVDIMM to be mastered from either port. A port, for instance, is an interface or shared boundary across which two separate components of computer system may exchange information. The dual-port NVDIMM may include universal memory (e.g., persistent memory) such as memristor-based memory, magnetoresistive random-access memory (MRAM), bubble memory, racetrack memory, ferroelectric random-access memory (FRAM), phase-change memory (PCM), programmable metallization cell (PMC), resistive random-access memory (RRAM), Nano-RAM, and etc.

The dual-port NVDIMM may include a first port to provide a central processing unit (CPU) access to universal memory of the dual-port NVDIMM. In this regard, an operating system (OS) and/or an application program may master the dual-port NVDIMM through the first port. According to an example of the present disclosure, the dual-port NVDIMM may also include a second port to provide a local NVDIMM manager circuit access to the universal memory of the dual-port NVDIMM. The NVDIMM manager circuit, for example, may be local to a memory application server, but external to dual-port NVDIMMs in the memory application server. Furthermore, the NVDIMM manager circuit may interface with remote storage that is external to the memory application server of the dual-port NVDIMM. The dual-port NVDIMM may also include a media controller to store data received from the CPU through the first port of the dual-port NVDIMM, acknowledge and control dual-port settings for the dual-port NVDIMM according to a request from the CPU through the first port of the dual-port NVDIMM, retrieve the stored data for transmittal to the NVDIMM manager circuit through the second port of the dual-port NVDIMM, and restore data received from the second port of the dual-port NVDIMM in the universal memory.

According to an example, the dual-port NVDIMMs may include direct memory access (DMA) engines that are integrated with the media controller to replicate the stored data to remote storage through the second port of the dual-port NVDIMM. By replicating the stored data to remote storage, the stored data is thus made durable. Durable data is permanent, highly-available, and recoverable due to replication to remote storage. The remote storage may include, but is not limited to, an interconnect (e.g., an interconnect module bay of a blade enclosure), a memory array server, and a replica memory application server of a memory fabric network. According to another example, the DMA engine may instead be integrated with the NVDIMM manager circuit that is external to the dual-port NVDIMM.

With single-port NVDIMMs, when the CPU requests to store a transaction payload, the CPU has to block the transaction in order to move the bytes of the transaction payload from the DIMM to a network OS-based driver stack, such as a server message block (SMB)/remote direct memory access (RDMA) software stack on top of RDMA capable network interface controllers (NICs). The OS-based driver stack then moves the bytes of the transaction payload to a remote storage, which stores the bytes in remote storage and transmits an acknowledgement to the CPU. Upon receiving the acknowledgement, the CPU may then finally unblock the transaction. As such, a user has to wait while the CPU replicates the transaction payload to remote storage for durability. Accordingly, implementing a high-availability model at the CPU or software level increases recovery time and may result in trapped data in event of a failure. High-availability models are designed to minimize system failures and handle specific failure modes for servers, such as memory application servers, so that access to the stored data is available at all times. Trapped data refers to data stored in the universal memory of NVDIMM that has not been made durable (i.e., has not been replicated to remote storage). With increases in recovery time and trapped data, users may be disappointed with the industry goals set for universal memory.

According to the disclosed examples, dual-port NVDIMMs may implement high-availability models on a hardware level, which is transparent from the CPU. That is, a dual-port NVDIMM may perform a data migration in the background so that the CPU is not burdened with performing the time-consuming data migration steps discussed above with single-port NVDIMMs. For example, the CPU may request that both ports of the dual-port NVDIMM are set to an active state (i.e., active-active redundancy flow). The active-active setting allows both the CPU and the NVDIMM manager circuit to access the dual-port NVDIMM simultaneously. In this regard, the DMA engine, which is integrated with the media controller, may replicate the data received from the CPU to the remote storage through the active second port of the dual-port NVDIMM in real-time or at a predetermined trigger time. Alternatively, the CPU may request that the first port of the dual-port NVDIMM be set to an active state and the second port of the dual-port NVDIMM be set to a passive state (i.e., active-passive redundancy flow). The active-passive setting allows the CPU to actively access the dual-port NVDIMM while the NVDIMM manager circuit put on standby as a failover server. In this regard, an external DMA engine, which may be integrated with the external NVDIMM manager circuit, may request the media controller retrieve the stored data in the universal memory at a predetermined trigger time to allow the external DMA engine to create an offline copy of the stored data to the remote storage through the passive second port of the dual-port NVDIMM.

The disclosed examples of dual-port NVDIMMs provide the technical benefits and advantages of enhancing recovery time objectives and recovery data objectives for application programs and/or operating systems. This allows application programs and/or operating systems to benefit from the enhanced performance of universal memory while gaining resiliency in the platform hardware, even in their most complex support of software high availability. These benefits are achieved using a single architectural design that bridges legacy software architecture into a new realm where application programs and operating systems have direct access to universal memory. For example, the disclosed dual-port NVDIMMs provide a hardware extension that may utilize system-on-chips (SOCs) to quickly move trapped NVDIMM data on a fabric channel between memory application servers. In other words, the dual-port NVDIMMs may ensure that the trapped NVDIMM data is made durable by replicating the data to remote storage. The fabric channels of the disclosed examples may be dedicated or shared over a customized or a traditional network fabric (e.g., Ethernet). Thus, utilizing the disclosed dual-port NVDIMMs, a single architecture can be customized for moving NVDIMM data at hardware speeds between memory application servers in a blade enclosure, across racks, or between data centers to achieve enterprise class resiliency.

With reference to FIG. 1, there is shown a block diagram of a dual-port NVDIMM 100, according to an example of the present disclosure. It should be understood that the dual-port NVDIMM 100 may include additional components and that one or more of the components described herein may be removed and/or modified without departing from a scope of the dual-port NVDIMM 100. The dual-port NVDIMM 100 may include a media controller 110, universal memory 120A-N (where the number of universal memory components may be greater than or equal to one), a first port 130, and a second port 140.

The dual-port NVDIMM 100 is a computer memory module that can be integrated into the main memory of a computing platform. The dual-port NVDIMM 100 may be included in a memory application server that is part of a blade enclosure. The dual-port NVDIMM 100, for example, may include universal memory 120A-N (e.g., persistent) to maintain data in the event of the power loss. The universal memory may include, but is not limited to, memristor-based memory, magnetoresistive random-access memory (MRAM), bubble memory, racetrack memory, ferroelectric random-access memory (FRAM), phase-change memory (PCM), programmable metallization cell (PMC), resistive random-access memory (RRAM), Nano-RAM, and etc.

The media controller 110, for instance, may communicate with its associated universal memory 120A-N and control access to the universal memory 120A-N by a central processing unit (CPU) 150 and a NVDIMM manager circuit 160. For example, the media controller 110 may provide access to the universal memory 120A-N through the first port 130 and the second port 140. Each port, for instance, is an interface or shared boundary across which the CPU 150 and the NVDIMM manager circuit 160 may access regions of the universal memory 120A-N.

According to an example, the CPU 150 may access the universal memory 120A-N through the first port 130. The CPU 150 may be a microprocessor, a micro-controller, an application specific integrated circuit (ASIC), field programmable gate array (FPGA), or other type of circuit to perform various processing functions for a computing platform. In one example, the CPU 150 is a server. On behalf of an application program and/or operating system, for instance, the CPU 150 may generate sequences of primitives such as read, write, swap, etc. requests to the media controller 110 through the first port 130 of the dual-port NVDIMM 100.

According to an example, the NVDIMM manager circuit 160 may access the universal memory 120A-N through the second port 140. The NVDIMM manager circuit 160 is external to the dual-port NVDIMM 100 and interfaces to a network memory fabric via a fabric interface chip with network connections to remote storage in the network memory fabric, such as replica memory application servers and memory array servers. The NVDIMM manager circuit 160 may be a system on a chip (SOC) that integrates a processor core and memory into a single chip.

As discussed further in examples below, a direct memory access (DMA) engine 170 may be integrated into the media controller 110 or the NVDIMM manager circuit 160. The DMA engine 170, for example, may move the bytes of data between hardware subsystems independently of the CPU 150. The various components shown in FIG. 1 may be coupled by a fabric interconnect (e.g., bus) 180, where the fabric interconnect 180 may be a communication system that transfers data between the various components.

Figure 2:
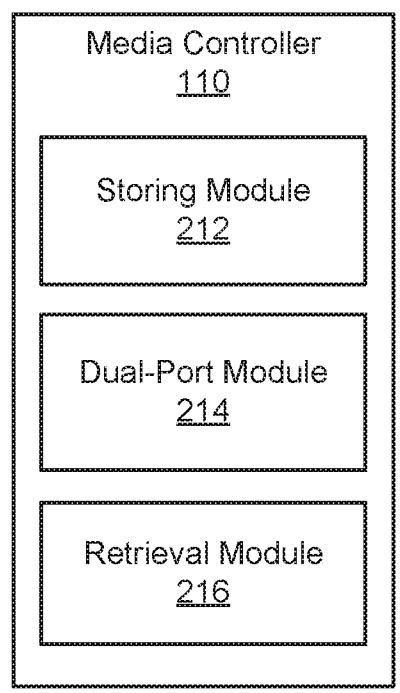
FIG. 2 shows a block diagram of a media controller of the dual-port NVDIMM according to an example of the present disclosure.

FIG. 2 shows a block diagram of a media controller 110 of the dual-port NVDIMM 100 according to an example of the present disclosure. The media controller 110 may include and process the functions of a storing module 212, a dual-port module 214, and a retrieval module 216. These functions provide an encompassing set of capabilities to enhance application program resiliency and data migration performance when implementing the dual-port NVDIMM 100.

The storing module 212, for instance, may store data received from the CPU 150 through the first port 130 of the dual-port NVDIMM 100 in the universal memory 120A-N and restore data received from the second port 140 of the dual-port NVDIMM 100 to the universal memory 120A-N of the dual-port NVDIMM 100 for access by a CPU of a replica memory application server through the first port 130 of the dual-port NVDIMM. The dual-port module 214, for instance, may acknowledge and control dual-port settings for the dual-port NVDIMM 100 according to a request from the CPU 150 through the first port 130 of the dual-port NVDIMM 100. The retrieval module 216, for instance, may retrieve the stored data for transmittal to the external NVDIMM manager circuit 160 through the second port 140 of the dual-port NVDIMM 100. Accordingly, the retrieved data may be replicated to remote storage, and thus made durable, through the second port 140 of the dual-port NVDIMM 100.

Modules 112-116 of the media controller 110 are discussed in greater detail below. In this example, modules 112-116 are circuits implemented in hardware. In another example, the functions of modules 112-116 may be machine readable instructions stored on a non-transitory computer readable medium and executed by a media controller, as discussed further below.

Figure 3:
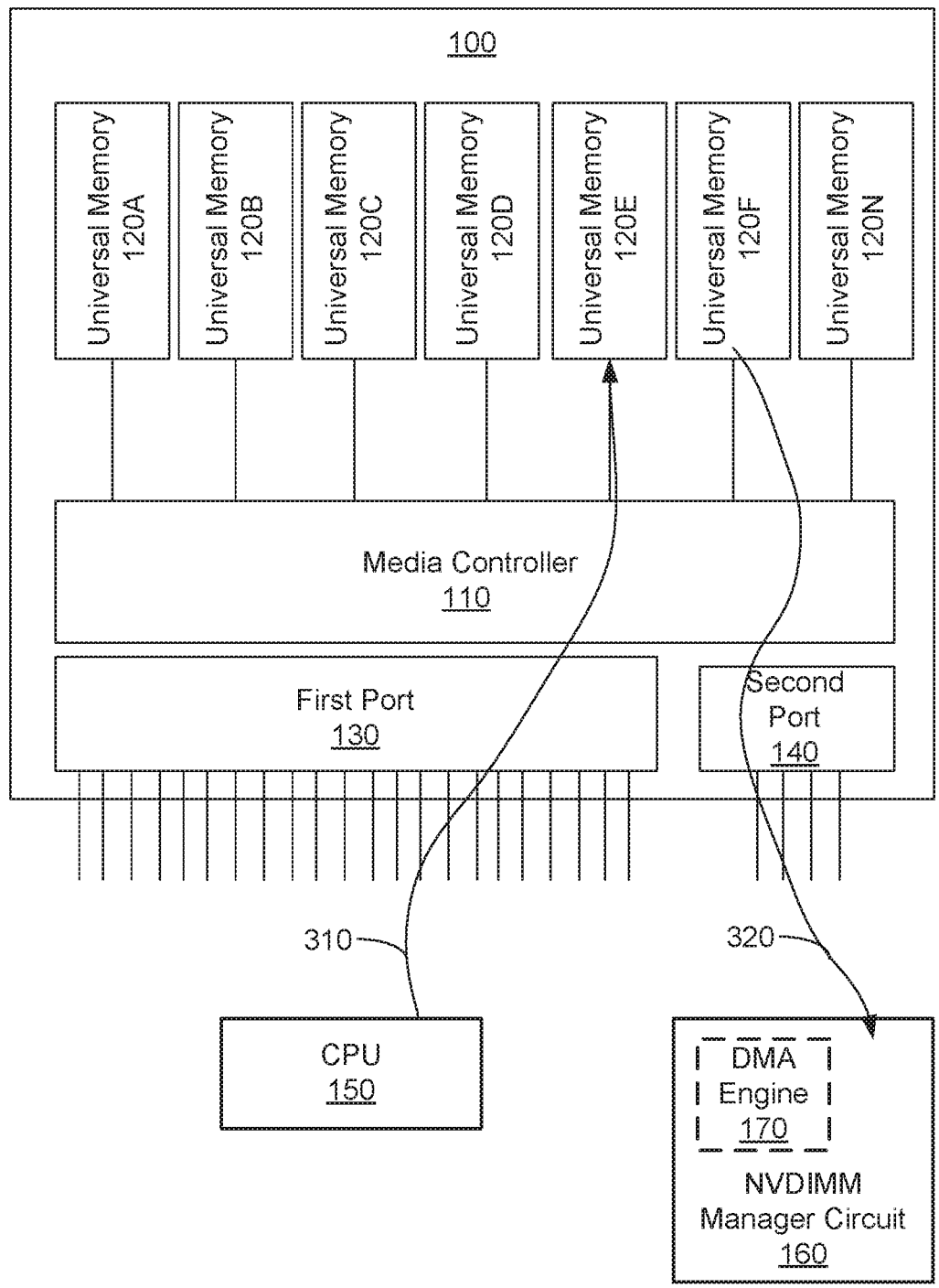
FIG. 3 shows a block diagram of an active-passive implementation of the dual-port NVDIMM, according to an example of the present disclosure.

FIG. 3 shows a block diagram of an active-passive implementation of the dual-port NVDIMM 100, according to an example of the present disclosure. In this implementation of the dual-port NVDIMM 100, the DMA engine 170 is external from the dual-port NVDIMM 100 and integrated with the NVDIMM manager circuit 160, The CPU 150 may issue requests as shown in arc 310 to the media controller through the first port 130. For example, the CPU 150 may issue requests including a write request to store data in the universal memory 120A-N and a dual-port setting request through the first port 130. The dual-port setting request may include a request for the media controller 110 to set the first port 130 of the dual-port NVDIMM 110 to an active state so that the CPU 150 can actively access the dual-port NVDIMM 100 and set the second port 140 of the dual-port NVDIMM 100 to a passive state to designate the NVDIMM manager circuit 160 as a standby failover server.

According to this example, the media controller 110 may receive a request from the external DMA engine 170 at a predetermined trigger time to retrieve the stored data in the universal memory 120A-N and transmit the stored data to the external DMA engine 170 through the passive second port 140 of the dual-port NVDIMM as shown in arc 320. The external DMA engine 170 may then make the stored data durable by creating an offline copy of the stored data in remote storage via the NVDIMM Manager Circuit 160.

Figure 4:
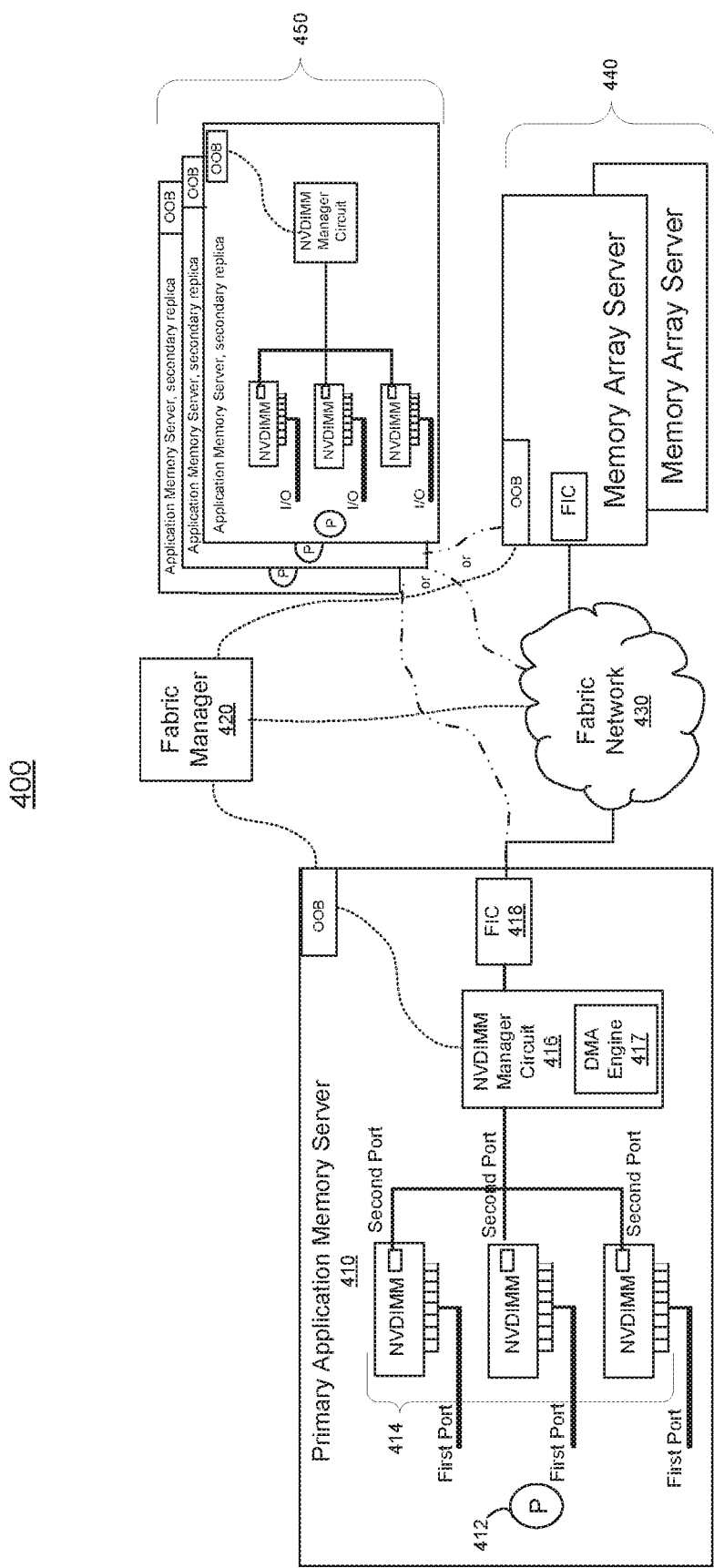
FIG. 4 shows a block diagram of memory fabric architecture including the active-passive implementation of the dual-port NVDIMM, according to an example of the present disclosure.

FIG. 4 shows a block diagram of memory fabric architecture 400 including the active-passive implementation of the dual-port NVDIMM 100, according to an example of the present disclosure. It should be understood that the memory fabric architecture 400 may include additional components and that one or more of the components described herein may be removed and/or modified without departing from a scope of the memory fabric architecture 400. The memory fabric architecture 400 may include a primary application memory server 410, a memory fabric manager 420, fabric network 430, memory array server 440, and secondary replica application memory servers 450, which are read-only application memory servers.

The primary application memory server 410 may include a processor 412, dual-port NVDIMMs 414, a NVDIMM manager circuit 416, and a fabric interconnect chip (FIC) 418. The processor 412 may, for example, be the CPU 150 discussed above. The processor 412, via the first ports of the dual-port NVDIMMs 414, may issue a request to store data in universal memory and request that the second ports of the dual-port NVDIMMs 414 are set to a passive state to designate the NVDIMM manager circuit 416 as a standby failover server. The NVDIMM manager circuit 416 may, for example, be the NVDIMM manager circuit 160 discussed above. In this memory fabric architecture 400, the DMA engine 417 is integrated with the NVDIMM manager circuit 416. The DMA engine 417 of the NVDIMM manager circuit 416 may access the dual-port NVDIMMs 414 through their second ports to retrieve stored data at a predetermined trigger time. The DMA engine 417 may then move the bytes of retrieved data to remote storage via the FIC 418 and the fabric network 430 to create a durable offline copy of the stored data in remote storage, such as the memory array servers 440 and/or the secondary replica application memory servers 450.

According to an example, the primary application memory server 410 may pass to the fabric manager 420 parameters via out-of-band management channels. These parameters may include parameters associated with the encryption and management of the encrypting keys on the fabric network 430 and/or the memory array servers 440. These parameters may also include high-availability attributes and capacities (e.g., static or dynamic) and access requirements (e.g., expected latencies, queue depths, etc.) according to service level agreements (SLAB) provided by the dual-port NVDIMMs 414, the fabric manager 420, and memory array servers 440.

The fabric manager 420 may setup, monitor, and orchestrate a selected high-availability capability for the memory fabric architecture 400. For example, the fabric manager 420 may manage universal memory ranges from the memory array servers 440 in coordination with the application memory servers that are executing the high-availability capabilities that are enabled for the dual-port NVDIMMs 414. The fabric manager 420 may commit memory ranges on the memory array servers 440. These committed memory ranges may be encrypted, compressed, or even parsed for storage and access optimizations. The fabric manager 420 may transmit event notifications of the memory array servers 440 to the application memory servers in the memory fabric. According to other examples, the fabric manager 440 may migrate the committed memory ranges to other memory array servers, synchronize updates to all of the application memory servers (e.g., primary 410 and secondary 450) in the fabric network 430 with the memory array servers 440, and may control whether the memory array servers 440 are shared or non-shared in the fabric network 430.

According to an example, the NVDIMM manager circuit 416 may use the network fabric 430, in synchronization with the fabric manager 420, to move a data working set with possible optimizations (e.g., encryption and compression) to the selected memory array servers 440, According to another example, under the control of the fabric manager 420, the connections to the secondary replica application memory servers 450 (e.g., other memory application servers or rack of memory application servers that act as a secondary replica of the primary application memory server 410) are established in a durable and data-safe way to provide another level of high-availability redundancy and access performance enhancements.

Figure 5:
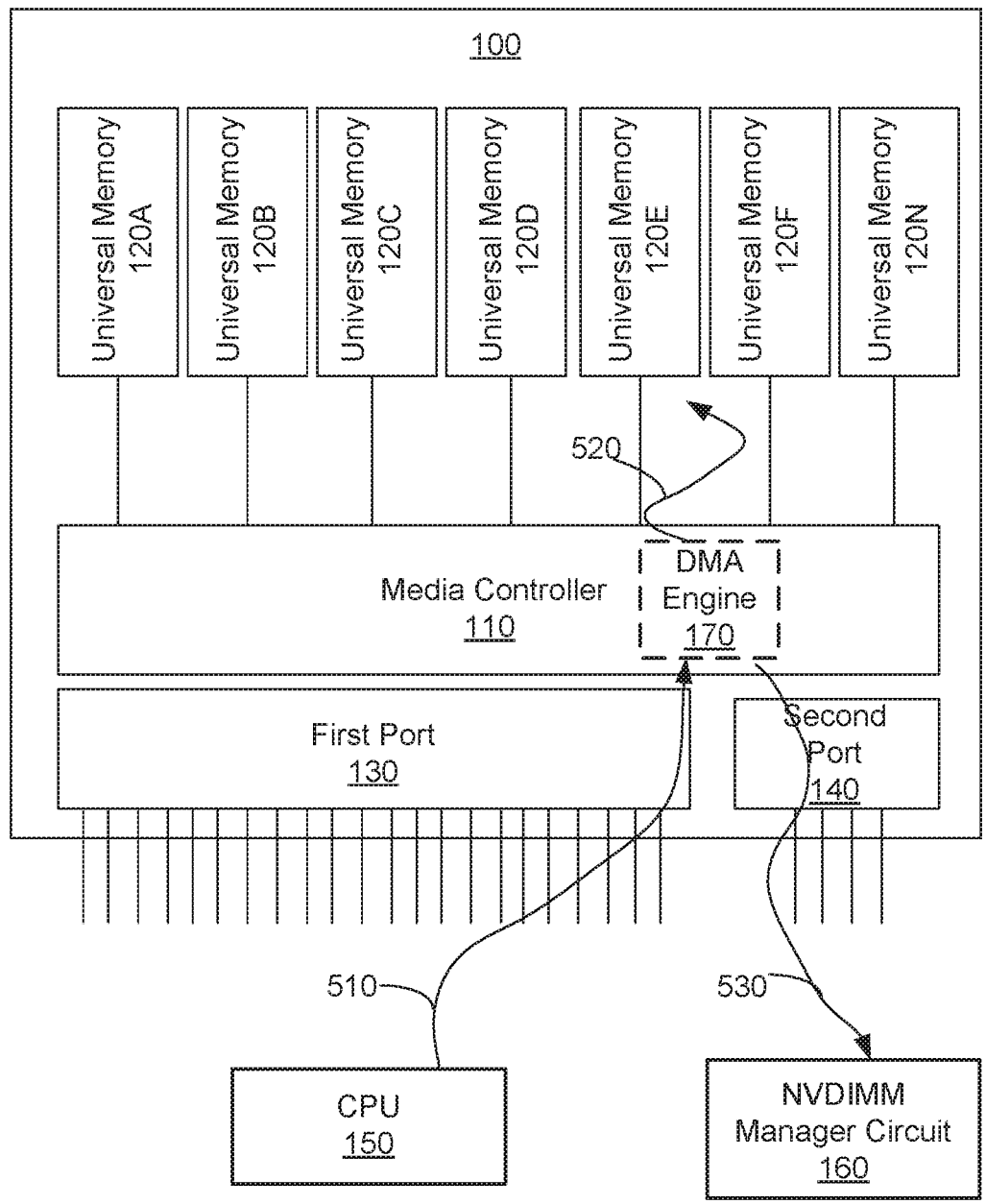
FIG. 5 shows a block diagram of an active-active implementation of the dual-port NVDIMM, according to an example of the present disclosure.

FIG. 5 shows a block diagram of an active-active implementation of the dual-port NVDIMM 100, according to an example of the present disclosure. In this implementation of the dual-port NVDIMM 100, the DMA engine 170 integrated with the media controller 110. The CPU 150 may issue requests as shown in arc 510 to the media controller 110 through the first port 130. For example, the CPU 150 may issue requests including a write request to store data in the universal memory 120A-N and a dual-port setting request through the first port 130. The dual-port setting request may include a request for the media controller 110 to set the first port 130 of the dual-port NVDIMM 110 and the second port 140 of the dual-port NVDIMM 100 to active state so that the CPU 150 and the NVDIMM manager circuit 160 may access the dual-port NVDIMM 100 simultaneously.

According to this example, the integrated DMA engine 170 of the media controller 110 may store the received data to universal memory 120A-N as shown in arc 520 and automatically move the bytes of the data to the NVDIMM manager circuit 160 in real-time through the active second port 140 as shown in arc 530 to replicate the data to in remote storage.

Figure 6:
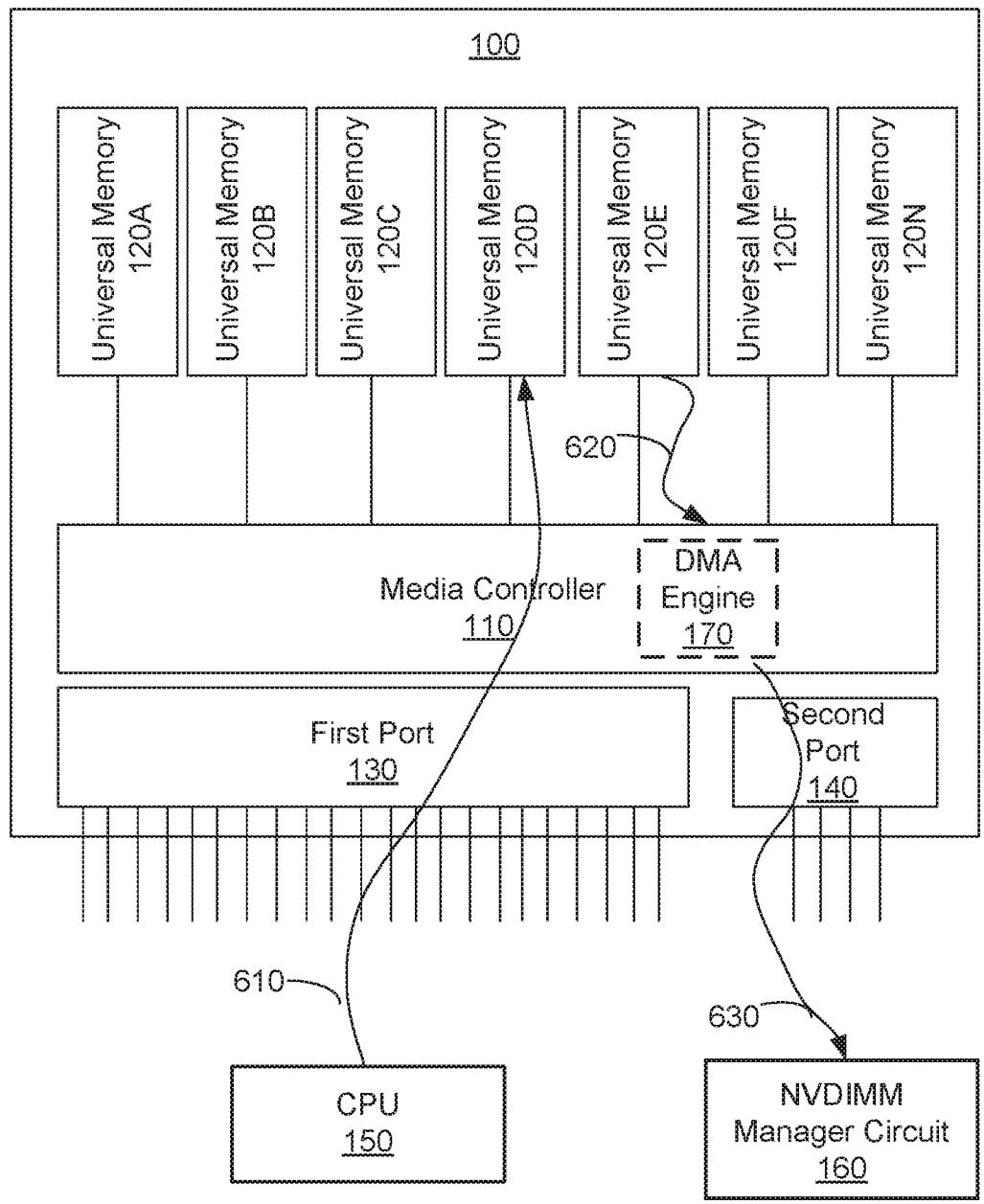
FIG. 6 shows a block diagram of an active-active implementation of the dual-port NVDIMM, according to another example of the present disclosure.

FIG. 6 shows a block diagram of an active-active implementation of the dual-port NVDIMM 100, according to another example of the present disclosure. In this implementation of the dual-port NVDIMM 100, the DMA engine 170 is also integrated with the media controller 110. The CPU 150 may issue requests as shown in arc 610 to the media controller 110 through the first port 130. For example, the CPU 150 may issue requests including a write request to store data in the universal memory 120A-N and a dual-port setting request through the first port 130. The dual-port setting request may include a request for the media controller 110 to set the first port 130 of the dual-port NVDIMM 110 and the second port 140 of the dual-port NVDIMM 100 to active state so that the CPU 150 and the NVDIMM manager circuit 160 may access the dual-port NVDIMM 100 simultaneously.

According to this example, however, the integrated DMA engine 170 does not replicate the data received from the CPU in real-time. Instead, integrated DMA engine 170 of the memory controller 110 may retrieve the stored data in the universal memory 120A-N at a predetermined trigger time as shown in arc 620. In this regard, the integrated DMA engine 170 may transmit the stored data through the passive second port 140 of the dual-port NVDIMM to the NVDIMM manager circuit 160 as shown in arc 330 to replicate the data in remote storage.

Figure 7:
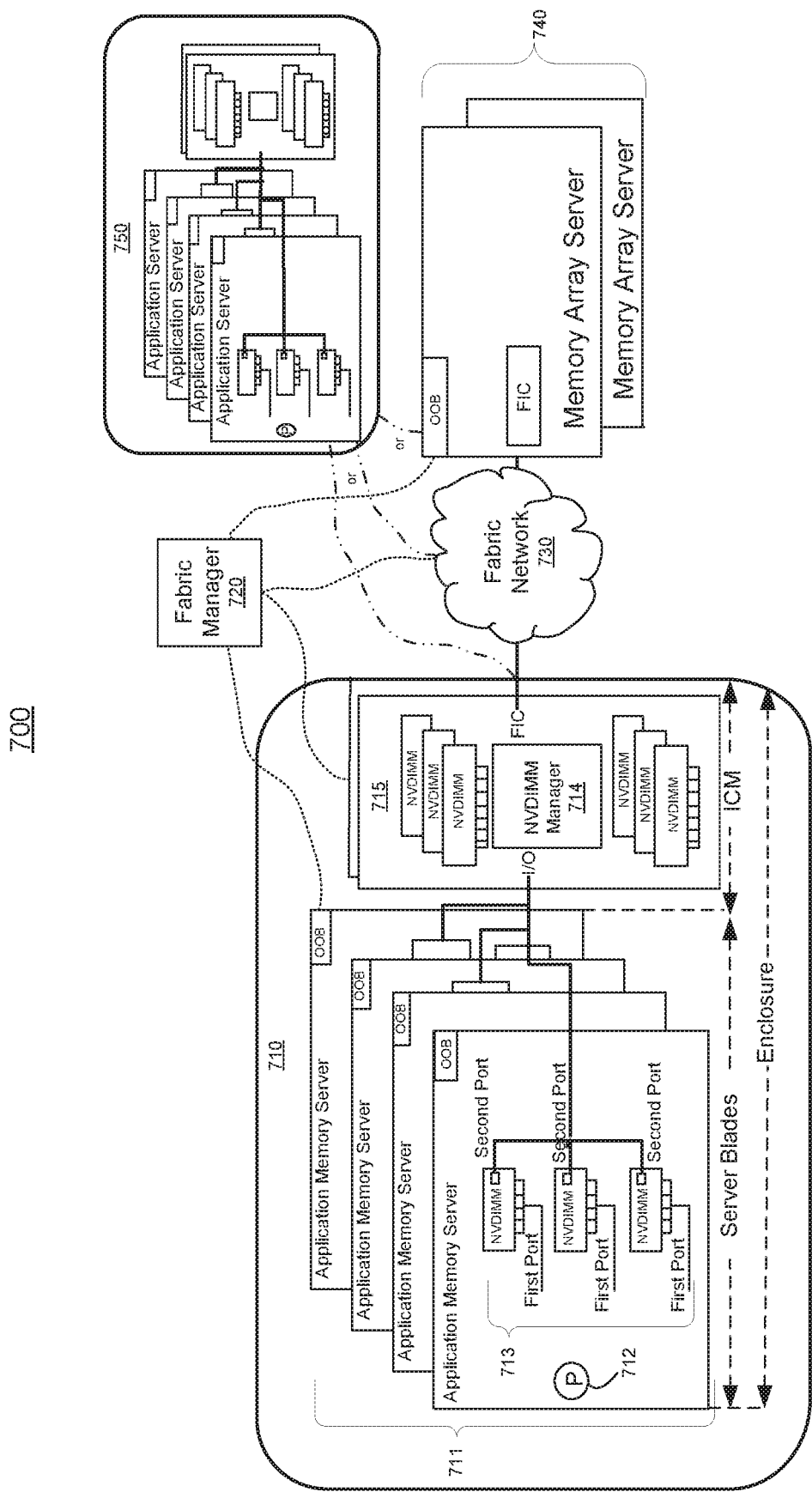
FIG. 7 shows a block diagram of memory fabric architecture including the active-active implementation of the dual-port NVDIMM, according to an example of the present disclosure.

FIG. 7 shows a block diagram of memory fabric architecture 700 including the active-active implementation of the dual-port NVDIMM 100, according to an example of the present disclosure. It should be understood that the memory fabric architecture 700 may include additional components and that one or more of the components described herein may be removed and/or modified without departing from a scope of the memory fabric architecture 700, The memory fabric architecture 700 may include a primary blade enclosure 710, a memory fabric manager 720, fabric network 730, memory array server 740, and secondary blade enclosure 750.

The primary blade enclosure may include server blades comprising a plurality of application memory servers 711. Each of the plurality of application memory servers 711 may include a processor 712 and dual-port NVDIMMs 713. The processor 712 may, for example, be the CPU 150 discussed above. In this example, the dual-port NVDIMMs 713 each have a DMA engine integrated within their memory controller. The processor 712, via the first ports of the dual-port NVDIMMs 713, may issue a request to store data in universal memory and request that the second ports of the dual-port NVDIMMs 711 be set to an active state to allow the NVDIMM manager circuit 714 of the interconnect bay module (ICM) 715 simultaneous access to the dual-port NVDIMMs 711. The NVDIMM manager circuit 714 is integrated in the ICM 715 of the memory blade enclosure 710. The ICM 715, for example, may also include dual-port NVDIMMs for storage within the ICM 715.

In this example, the DMA engines, which are integrated within the media controllers of each of the plurality of dual-port NVDIMMs 713 of the application memory servers 711, may automatically move the bytes of data received from the processor 712 to the NVDIMM manager 714 through the active second ports of the dual-port NVDIMMs 713 in real-time for replication to the dual-port NVDIMMs on the ICM 715. According to another example, the DMA engines may instead trigger, at a predetermined time, the migration of the stored data to the NVDIMM manager 714 through the active second ports for replication to the dual-port NVDIMMs on the ICM 715.

The memory fabric architecture 700 is a tiered solution where the ICM 715 may be used to quickly replicate data off of the plurality of memory application servers 711. This tiered solution allows replicated data to be stored within the primary memory blade enclosure 710. As a result of replicating data replication within the ICM bay 715 (but remote from the plurality of memory application servers 711), the replicated data can be managed and controlled as durable storage. With durable data stored in the blade memory enclosure 710, a tightly coupled local-centric, high-availability domain (e.g., an active-active redundant application memory server solution within the enclosure) is possible.

According to an example, the NVDIMM manager 714 may, in concert with the fabric manager 720, further replicate the stored data to the memory array server 740 and the secondary blade enclosure 750 via the fabric network 730 to provide another level of high-availability redundancy and access performance enhancements in the memory fabric architecture 700. The functions of the fabric manager 720, fabric network 730, memory array servers 740, and secondary blade enclosure 750 are similar to that of the fabric manager 420, fabric network 430, memory array server 440, and secondary replica application memory servers 450 discussed above in FIG. 4.

Figure 8:
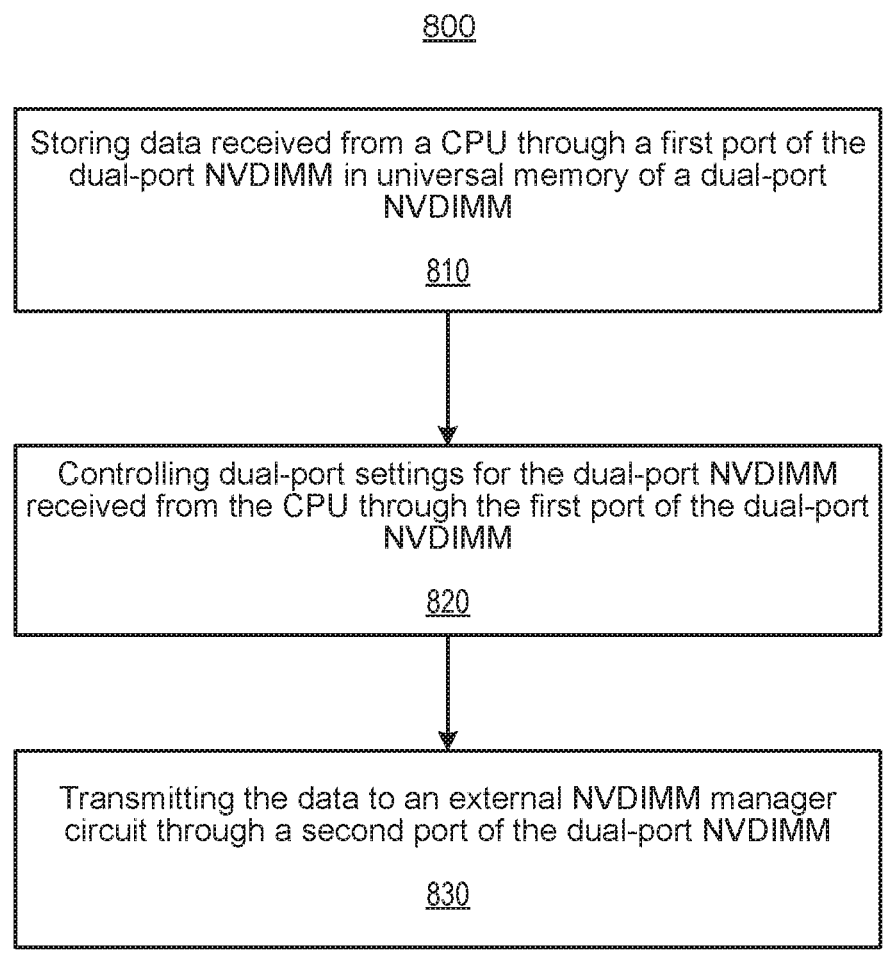
FIG. 8 shows a flow diagram of a method to facilitate high-availability capabilities using a dual-port NVDIMM, according to an example of the present disclosure.

With reference to FIG. 8, there is shown a flow diagram of a method 800 to facilitate high-availability capabilities using the dual-port NVDIMM, according to an example of the present disclosure. It should be apparent to those of ordinary skill in the art that method 800 represents generalized illustrations and that other sequences may be added or existing sequences may be removed, modified or rearranged without departing from the scope of the method.

In block 810, the storing module 212 of the media controller 110, for instance, may store data received from a central processing unit (CPU) through a first port of the dual-port NVDIMM in universal memory of the dual-port NVDIMM. According to another example, the storing module 212 may also restore data received from a second port of the dual-port NVDIMM to the universal memory of the dual-port NVDIMM for access by a CPU of a replica memory application server through the first port of the dual-port NVDIMM.

In block 820, the dual-port module 214 of the media controller 110, for instance, may receive dual-port settings for the dual-port NVDIMM from the CPU through the first port of the dual-port NVDIMM. The received dual-port settings may include an active-active or active-passive high-availability setting.

In response to receiving active-active settings from the CPU, the dual-port module 214 may activate both the first port and the second port of the dual-port NVDIMM so that the CPU and NVDIMM manager circuit can simultaneously access the dual-port NVDIMM. The direct memory access (DMA) engine may be integrated with the media controller of the dual-port NVDIMM for the active-active setting.

Alternatively, in response to receiving active-passive settings from the CPU, the dual-port module 214 may set the first port of the dual-port NVDIMM to an active state so that the CPU can actively access the dual-port NVDIMM and set the second port of the dual-port NVDIMM to a passive state to designate the NVDIMM manager circuit as a standby failover server. The direct memory access (DMA) engine may be integrated with an external NVDIMM manager circuit for the active-active setting.

In block 830, the retrieval module 216 of the media controller 110 may retrieve the data received from a central processing unit (CPU) and transmit the data to the external NVDIMM manager circuit through a second port of the dual-port NVDIMM based on the received dual-port settings.

For example, if the received dual-port setting is active-active, the retrieval module 216 may automatically transmit in real-time the data received from the CPU through the active second port of the dual-port NVDIMM to the external NVDIMM manager circuit for replication to remote storage. In another example, where the received dual-port setting is active-active, the retrieval module 216 may wait until a predetermined trigger time to transmit the data stored in universal memory to the NVDIMM manager circuit through the active second port of the dual-port NVDIMM for replication to remote storage.

Alternatively, if the received dual-port setting is active-passive, the retrieval module 216 may retrieve the data stored in the universal memory at the predetermined time, as requested by the external DMA engine. In this regard, the retrieval module 216 may transmit the retrieved data through the passive second port of the dual-port NVDIMM to the NVDIMM manager circuit to create an offline copy of the data to remote storage.

Some or all of the operations set forth in the method 800 may be contained as utilities, programs, or subprograms, in any desired computer accessible medium. In addition, method 800 may be embodied by computer programs; which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 9:
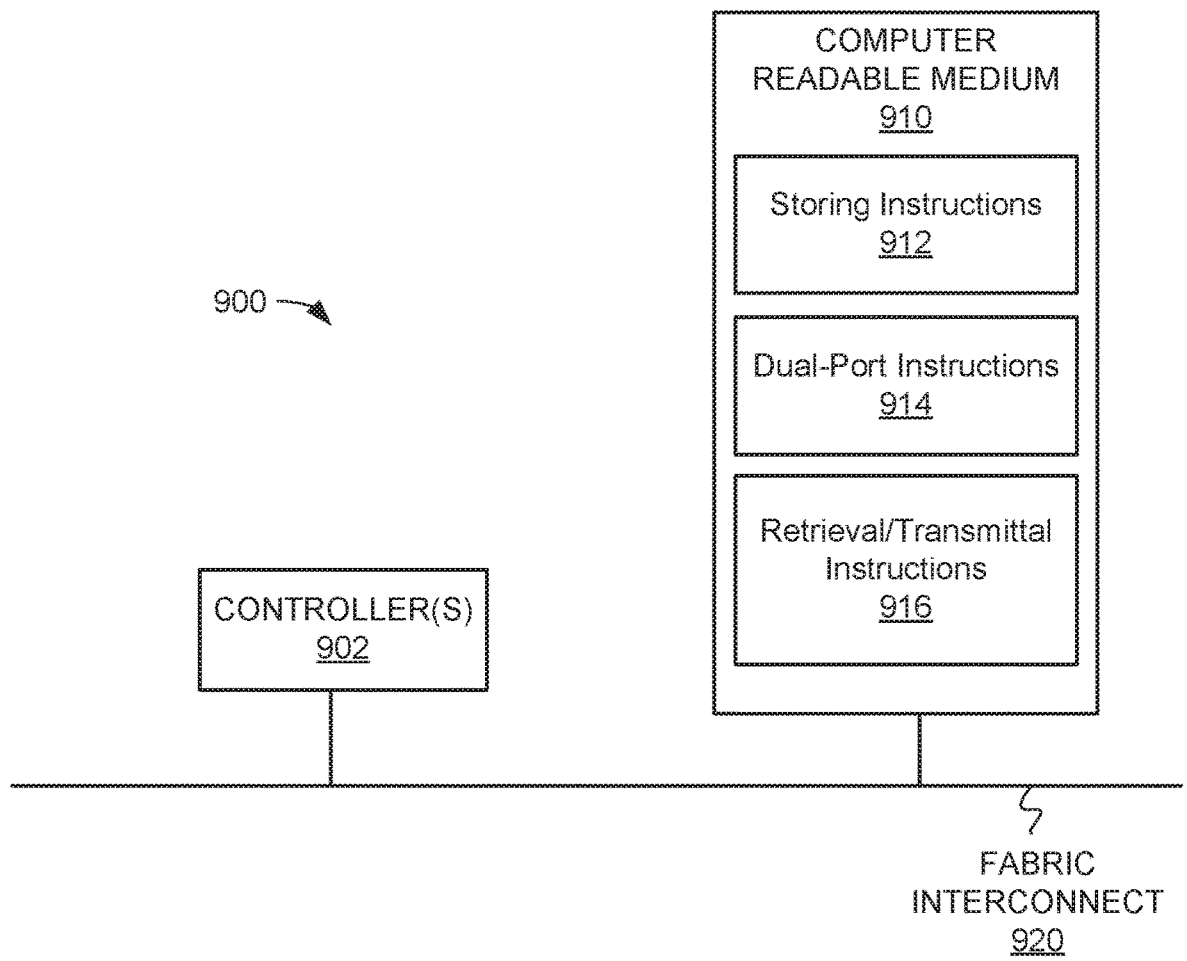
FIG. 9 shows a schematic representation of a computing device, which may be employed to perform various functions of a media controller, according to an example of the present disclosure.

Turning now to FIG. 9, a schematic representation of a computing device 900, which may be employed to perform various functions of the media controller 110, is shown according to an example implementation. The device 900 may include a controller 902 coupled to a computer-readable medium 910 by a fabric interconnect 920. The computer readable medium 910 may be any suitable medium that participates in providing instructions to the controller 902 for execution. For example, the computer readable medium 910 may be non-volatile media, such as an optical or a magnetic disk; volatile media, such as memory.

The computer-readable medium 910 may store instructions to perform method 800. For example, the computer-readable medium 910 may include machine readable instructions such as storing instructions 912 to store data received from a central processing unit (CPU) through a first port of the dual-port NVDIMM in universal memory of the dual-port NVDIMM, dual-port instructions 914 to assign dual-port settings for the dual-port NVDIMM received from the CPU through the first port of the dual-port NVDIMM, and retrieval/transmittal instructions 916 to retrieve the data received from the CPU and transmit the data to an external NVDIMM manager circuit through a second port of the dual-port NVDIMM based on the received dual-port settings. In this regard, the computer-readable medium 910 may include machine readable instructions to perform method 800 when executed by the controller 902.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A dual-port non-volatile dual in-line memory module (NVDIMM), comprising:
    a first port to provide a first central processing unit (CPU) of a first server with local, wherein the universal memory is non-volatile;
    a second port to provide an external NVDIMM manager circuit of the first server with local access to the universal memory of the dual-port NVDIMM, the first port and the second port allowing simultaneous access to the universal memory, wherein the external NVDIMM manager circuit interfaces with a remote storage device via a fabric interface chip of the NVDIMM manager circuit using network connections to the remote storage communicatively connected by a network memory fabric; and
    a media controller integrated within the dual-port NVDIMM having direct memory access (DMA) to the universal memory, the media controller to:
        control access to the universal memory by the first CPU via the first port and by the NVDIMM manager circuit via the second port;
        store first data received from the first CPU through the first port of the dual-port NVDIMM in the universal memory,
        control dual-port settings for the dual-port NVDIMM received from the first CPU through the first port of the dual-port NVDIMM, wherein the dual-port settings include at least one of an active-active redundancy flow and an active-passive redundancy flow,
        retrieve the first data from the universal memory and provide the retrieved first data to the NVDIMM manager circuit through the second port of the dual-port NVDIMM for transmission to the remote storage device, and store second data received, via the NVDIMM manager circuit, from a remote server into the universal memory using the second port of the dual-port NVDIMM.

2. The dual-port NVDIMM of claim 1, wherein, responsive to a control request to the dual-port NVDIMM from the first CPU through the first port, controlling the dual-port settings to be the active-active redundancy flow, the media controller is to set both the first port and the second port of the dual-port NVDIMM to an active state to configure the first port as an active first port and the second port as an active second port so that the first CPU and the external NVDIMM manager circuit can simultaneously access the universal memory of the dual-port NVDIMM.

3. The dual-port NVDIMM of claim 2, wherein the media controller comprises an integrated direct memory access (DMA) engine to migrate the stored first data to the external NVDIMM manager circuit through the active second port of the dual-port NVDIMM for replication to the remote storage device.

4. The dual-port NVDIMM of claim 3, wherein the integrated DMA engine is to replicate based on a configuration setting by:
automatically replicating the first data to the remote storage device through the active second port of the dual-port NVDIMM and the external NVDIMM manager circuit in real-time; or
retrieving the first data from the universal memory at a predetermined time to transmit to the external NVDIMM manager circuit through the active second port of the dual-port NVDIMM for replication to the remote storage device.

5. The dual-port NVDIMM of claim 1, wherein, responsive to a control request to the dual-port NVDIMM from the first CPU through the first port, controlling the dual-port settings to be the active-passive redundancy flow, the media controller is to set the first port of the dual-port NVDIMM to an active state to configure an active first port so that the CPU can actively access the dual-port NVDIMM and set the second port of the dual-port NVDIMM to a passive state to configure a passive second port and to designate the external NVDIMM manager circuit as a standby failover server.

6. The dual-port NVDIMM of claim 5, wherein the media controller is to:
receive a request from an external DMA engine, which is integrated with the external NVDIMM manager circuit, to retrieve the first data from the universal memory at a predetermined time through the passive second port of the dual-port NVDIMM; and
transmit the first data to the external NVDIMM manager circuit through the passive second port of the dual-port NVDIMM to create an offline copy of the first data in the remote storage device.

7. The dual-port NVDIMM of claim 1, wherein the media controller is to restore additional data received from the second port of the dual-port NVDIMM in the universal memory for access by a second CPU of the first server performing as a replica memory application server.

8. The dual-port NVDIMM of claim 1, wherein the media controller is to transmit the first data, via the external NVDIMM manager circuit, to the remote storage device, wherein the remote storage device comprises at least one of a memory array server, a replica memory application server, and persistent storage within an interconnect, and wherein the remote storage device is external to the first server performing as an application memory server including the media controller and the first CPU.

9. A method to facilitate high-availability capabilities using a dual-port non-volatile dual in-line memory module (NVDIMM) of a server, comprising:
storing, by a media controller integrated within the dual-port NVDIMM having direct, wherein the universal memory is non-volatile, received from a first central processing unit (CPU) through a first port of the dual-port NVDIMM, in the universal memory, the first CPU local to the server;
controlling, by the media controller, dual-port settings for the dual-port NVDIMM received from the first CPU through the first port of the dual-port NVDIMM; and
retrieving, by the media controller, the first data from the universal memory and providing, by the media controller, the retrieved first data to an external NVDIMM manager circuit of the server through a second port of the dual-port NVDIMM for replication to remote storage via a fabric interface chip of the NVDIMM manager circuit using network connections to the remote storage communicatively connected by a network memory fabric; and
storing, by the media controller, second data received, via the NVDIMM manager circuit, from a remote server into the universal memory using the second port,
wherein the first port and the second port allow simultaneous access to the universal memory.

10. The method of claim 9, wherein a direct memory access (DMA) engine is integrated with the media controller of the dual-port NVDIMM, and wherein controlling the dual-port settings further comprises setting both the first port and the second port of the dual-port NVDIMM to an active state to configure an active first port and an active second port so that the first CPU and NVDIMM manager circuit can simultaneously access the universal memory of the dual-port NVDIMM.

11. The method of claim 10, wherein retrieving and providing the first data to the external NVDIMM manager circuit is based on a configuration setting to:
automatically transmit, in real-time, the first data through the active second port of the dual-port NVDIMM to the external NVDIMM manager circuit for replication to a remote storage, or
transmit, at a predetermined trigger time, the first data from the universal memory through the active second port of the dual-port NVDIMM to the external NVDIMM manager circuit for replication to the remote storage.

12. The method of claim 9, wherein an external DMA engine is integrated with the external NVDIMM manager circuit, and wherein controlling the dual-port settings further comprises setting the first port of the dual-port NVDIMM to an active state to configure an active first port so that the first CPU can actively access the dual-port NVDIMM and setting the second port of the dual-port NVDIMM to a passive state to configure a passive second port and to designate the external NVDIMM manager circuit as a standby failover server.

13. The method of claim 12, wherein retrieving and providing the first data to the external NVDIMM manager circuit further comprises:
retrieving the first data stored in the universal memory at a predetermined time requested by the external DMA engine, and
providing the first data through the passive second port of the dual-port NVDIMM to the external NVDIMM manager circuit to facilitate creation of an offline copy of the first data in the remote storage.

14. The method of claim 9, further comprising restoring second data received from the second port of the dual-port NVDIMM to the universal memory of the dual-port NVDIMM for access by a second CPU, of the server performing as a replica memory application server, through the first port of the dual-port NVDIMM.

15. A non-transitory computer readable medium, to facilitate high-availability capabilities using a dual-port non-volatile dual in-line memory module (NVDIMM) of a server, including machine readable instructions executable by a processor to cause the processor to:
receive first data from a first central processing unit (CPU) through a first port of the dual-port NVDIMM, the first CPU local to the server;
store, via a media controller integrated within the dual-port NVDIMM having direct wherein the universal memory is non-volatile, the universal memory;
acknowledge a high-availability setting provided by the first CPU via the first port, wherein the high-availability setting includes at least one of an active-active redundancy flow and an active-passive redundancy flow;
transmit, based on the acknowledged high-availability setting, the first data to an external NVDIMM manager circuit through a second port of the dual-port NVDIMM for replication to remote storage, the external NVDIMM manager circuit local to the server and including a fabric interface chip providing network connections to the remote storage communicatively coupled by a network memory fabric; and
store second data received, via the external NVDIMM manager circuit, from a remote server into the universal memory using the second port of the dual-port NVDIMM,
wherein the first port and the second port allow simultaneous access to the universal memory.

16. The non-transitory computer readable medium of claim 15, wherein the machine readable instructions further cause the processor to:
instruct the media controller, responsive to controlling the dual-port settings to be the active-active redundancy flow, to set both the first port and the second port of the dual-port NVDIMM to an active state to configure the first port as an active first port and the second port as an active second port so that the first CPU and the external NVDIMM manager circuit can simultaneously access the universal memory of the dual-port NVDIMM.

17. The non-transitory computer readable medium of claim 16, wherein the media controller comprises an integrated direct memory access (DMA) engine to migrate the first data to the external NVDIMM manager circuit through the active second port of the dual-port NVDIMM for replication to the remote storage device.

18. The non-transitory computer readable medium of claim 17, wherein the integrated DMA engine is to replicate based on a configuration setting by:
automatically replicating the first data to the remote storage device through the active second port of the dual-port NVDIMM in real-time; or
retrieve the first data from the universal memory at a predetermined time to transmit to the external NVDIMM manager circuit through the active second port of the dual-port NVDIMM for replication to the remote storage device.

19. The non-transitory computer readable medium of claim 15, wherein the machine readable instructions further cause the processor to:
instruct the media controller, responsive to controlling the dual-port settings to be the active-passive redundancy flow, to set the first port of the dual-port NVDIMM to an active state to configure an active first port so that the first CPU can actively access the dual-port NVDIMM and set the second port of the dual-port NVDIMM to a passive state to configure a passive second port and to designate the external NVDIMM manager circuit as a standby failover server.

20. The non-transitory computer readable medium of claim 15, wherein the machine readable instructions further cause the processor to cause the media controller to:
receive a request from an external DMA engine, which is integrated with the external NVDIMM manager circuit, the request to retrieve the first data from the universal memory at a predetermined time through the passive second port of the dual-port NVDIMM; and
transmit the first data to the external NVDIMM manager circuit through the passive second port of the dual-port NVDIMM to create an offline copy of the first data in the remote storage device.

* * * * *